United States Patent
Lee et al.

(10) Patent No.: US 12,314,185 B2
(45) Date of Patent: May 27, 2025

(54) METHOD AND APPARATUS FOR SORTING DATA, STORAGE APPARATUS

(71) Applicant: Beijing Tenafe Electronic Technology Co., Ltd., Beijing (CN)

(72) Inventors: Meng Kun Lee, Cupertino, CA (US); Chen Xiu, Beijing (CN); Weitao Xu, Shanghai (CN); Lyle E. Adams, San Jose, CA (US)

(73) Assignee: Beijing Tenafe Electronic Technology Co., Ltd. (CN)

( * ) Notice: Subject to any disclaimer, the term of this patent is extended or adjusted under 35 U.S.C. 154(b) by 0 days.

(21) Appl. No.: 17/898,723

(22) Filed: Aug. 30, 2022

(65) Prior Publication Data

US 2023/0076550 A1 Mar. 9, 2023

(30) Foreign Application Priority Data

Sep. 1, 2021 (CN) .......................... 202111019804.2

(51) Int. Cl.
*G06F 12/00* (2006.01)
*G06F 12/0875* (2016.01)
*G06F 12/1009* (2016.01)

(52) U.S. Cl.
CPC ...... *G06F 12/1009* (2013.01); *G06F 12/0875* (2013.01); *G06F 2212/1028* (2013.01); *G06F 2212/305* (2013.01)

(58) Field of Classification Search
CPC ............ G06F 12/1009; G06F 12/0875; G06F 2212/1028; G06F 2212/305; G06F 12/0895; Y02D 10/00
See application file for complete search history.

(56) References Cited

U.S. PATENT DOCUMENTS

| | | | |
|---|---|---|---|
| 2015/0095555 A1* | 4/2015 | Asnaashari | G06F 3/0665 711/114 |
| 2016/0283116 A1* | 9/2016 | Ramalingam | G06F 3/0679 |
| 2020/0110536 A1* | 4/2020 | Navon | G06F 3/0616 |
| 2020/0151110 A1* | 5/2020 | Haswell | G06F 12/0246 |
| 2020/0341959 A1* | 10/2020 | Shabi | G06F 16/2246 |

* cited by examiner

*Primary Examiner* — Arvind Talukdar
(74) *Attorney, Agent, or Firm* — Van Pelt, Yi & James LLP

(57) ABSTRACT

For each data in a plurality of data, data is read from a cache unit. For each data in the plurality of data, a group to which the data read from the cache unit belongs to is determined based at least in part on a predetermined grouping rule. A determination is made of (1) a quantity of groups and (2) a quantity of data corresponding to each group after determining the groups to which the plurality of data belong. Data belonging to a same group is written into a contiguous storage space of the cache unit, including by: sequentially reading the plurality of data from the cache unit and sequentially writing the plurality of data into the cache unit.

19 Claims, 10 Drawing Sheets

METHOD AND APPARATUS FOR SORTING DATA, STORAGE APPARATUS

CROSS REFERENCE TO OTHER APPLICATIONS

This application is based upon and claims priority to People's Republic of China Patent Application No. 202111019804.2 entitled METHOD AND APPARATUS FOR SORTING DATA, STORAGE APPARATUS filed Sep. 1, 2021 which is incorporated herein by reference for all purposes.

BACKGROUND OF THE INVENTION

In a Solid State Disk (SSD), a Mapping Table needs to be queried to correspond a Logical Block Address (LBA) to a physical address for data reading and writing.

FIG. 1 shows an example for data reading and writing in a Solid State Disk by using the Mapping Table. Specifically, a LBA Cache 102 stores a Logical Block Address received from a Host, the Mapping Table Cache 104 stores a Mapping Table indicating a mapping relationship between the Logical Block Address and a physical address in a storage unit 106, and the Solid State Disk needs to access the Mapping Table in the Mapping Table Cache 104 to find the physical address corresponding to the Logical Block Address, so as to complete access to the storage unit 106 based on the physical address. A common Solid State Disk usually has an onboard cache inside (e.g., Dynamic Random Access Memory (DRAM) and/or Static Random Access Memory (SRAM)) for caching a Mapping Table.

In some high-performance Solid State Disks, in order to improve the reading and writing efficiency, all Mapping Tables of the Solid State Disks are loaded into the onboard cache, such that all storage units of the Solid State Disks may be accessed at any time. However, this method requires a larger-capacity cache, which leads to high cost and high power consumption of the Solid State Disk. In some other Solid State Disks, in order to reduce the cost, a smaller-capacity cache may be used, but this configuration may result in not being able to load all Mapping Tables into the cache. If corresponding relationships between a plurality of Logical Block Addresses and physical addresses received from the Host are stored separately in different Mapping Tables, the mapping tables in the cache needs to be swapped in and out several times in order to access the physical addresses corresponding to the plurality of Logical Block Addresses, resulting in higher power consumption and reducing the reading and writing efficiency.

Therefore, it is necessary to provide a method and apparatus for improving data reading and writing efficiency and reducing power consumption under the condition of limited cache space.

BRIEF DESCRIPTION OF THE DRAWINGS

Various embodiments of the invention are disclosed in the following detailed description and the accompanying drawings.

DETAILED DESCRIPTION

Figure 1:
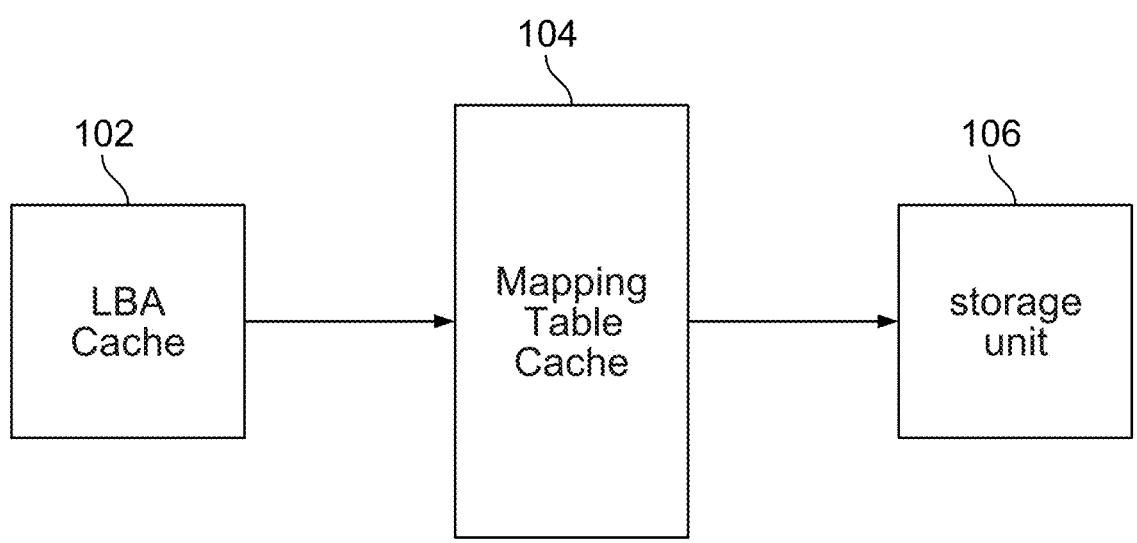
FIG. 1 is a schematic diagram showing data reading and writing in a Solid State Disk by using a Mapping Table.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques and/or systems to sort and store data are described herein.

In some embodiments, a method for sorting data is provided where the method includes: a) reading a data from a cache unit; b) determining a group to which the data read in step a) belongs to based on a predetermined grouping rule; c) repeating the steps a) and b) for a plurality of times; d) determining a quantity of groups (e.g., the number of groups produced by a sorting module) and a quantity of data corresponding to each group (e.g., the amount of data assigned to a given or particular group by a sorting module) after determining the groups to which a plurality of data belong to; and e) writing data belonging to a same group into a contiguous storage space of the cache unit by sequentially reading the plurality of data from the cache unit again, and sequentially writing the plurality of data into the cache unit.

In some embodiments, a system for sorting data is provided where the system includes: a reading unit configured to read data from a cache unit; a group counting unit configured to determine a group to which the data read by the reading unit belongs to based on a predetermined grouping rule, and determine a quantity of groups and a quantity of data corresponding to each group; a writing unit configured to write the data read by the reading unit into the cache unit; and a control unit configured to perform the following operations and/or steps: a): controlling the reading unit to read the data from the cache unit; b): controlling the group accounting unit to determine the group to which the data read by the reading unit belongs based on the predetermined grouping rule; c): controlling the reading unit to read data from the cache unit for a plurality of times, and controlling the group counting unit to determine the group to which a corresponding data read by the reading unit belongs based on the predetermined grouping rule for a plurality of times; d): controlling the group counting unit to determine a quantity of the groups and a quantity of data corresponding to each group after the group counting unit determines the groups to which a plurality of data belong; and e): controlling the reading unit to sequentially read the plurality of data from the cache unit again, and controlling the writing unit to sequentially write the plurality of data into the cache unit, wherein the data belonging to a same group are written into a contiguous storage space of the cache unit.

In some embodiments, a storage system is provided, where the storage system includes: a main storage unit that includes a non-volatile storage medium; a cache unit configured to cache a plurality of data from a Host; and a system for sorting data described previously; and a main control unit configured to access the main storage unit based on the sorted data stored in the cache unit.

The following figures describe some examples where Logical Block Addresses are sorted and stored. It is noted that the techniques described herein may be used to sort various data and are not necessarily limited to Logical Block Addresses.

Figure 2:
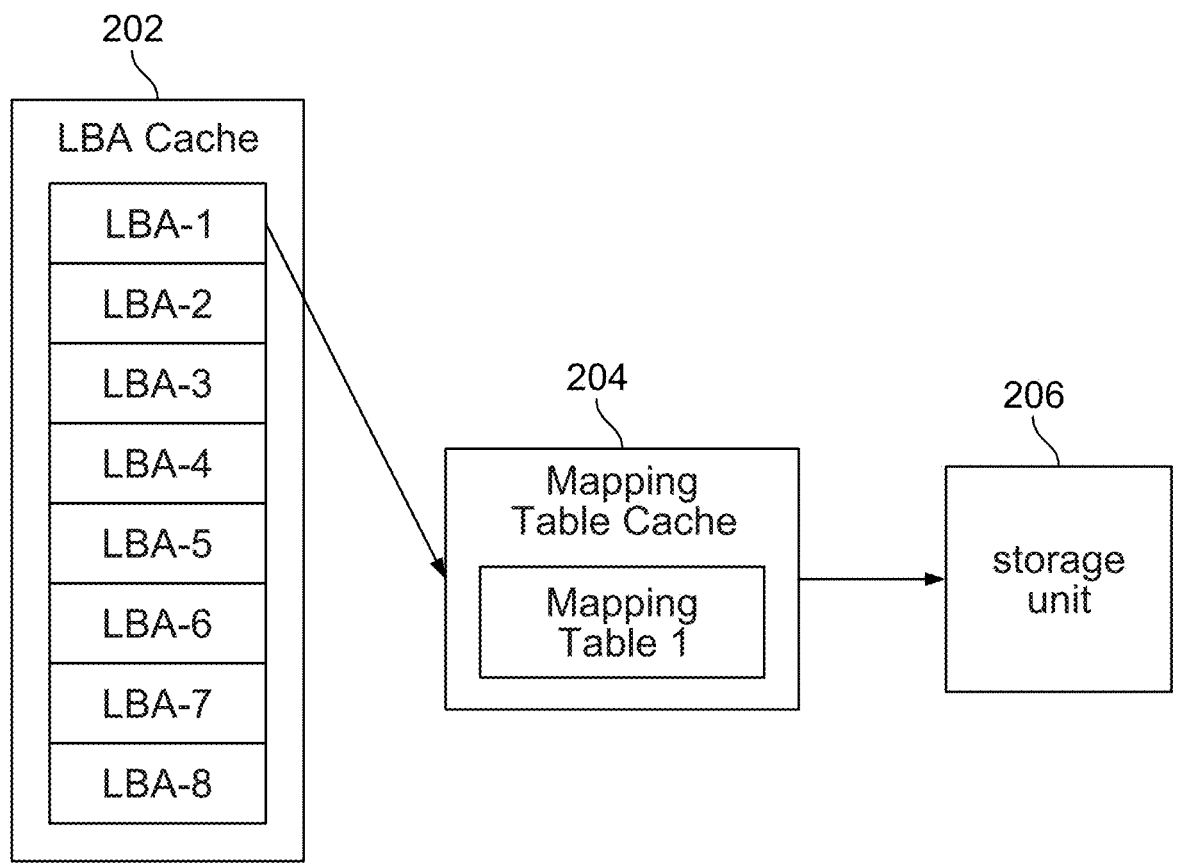
FIG. 2 is a schematic diagram showing data reading and writing in a Solid State Disk with a smaller cache in some other systems.

FIG. 2 is a schematic diagram showing an example of data reading and writing module of a Solid State Disk with a smaller Mapping Table Cache in some other systems. In the example shown in FIG. 2, there are eight Logical Block Addresses, i.e., LBA-1 to LBA-8, stored in an LBA Cache 202, where corresponding relationships between the eight LBAs and the corresponding physical addresses in a storage unit 206 are stored in four Mapping Tables, and the corresponding relationship between each LBA and the Mapping Table is shown in table 1 below.

In this example, a storage space of Mapping Table Cache 204 is relatively small, and only one Mapping Table may be loaded in the Mapping Table Cache 204 at a time. To access a physical address in storage unit 206 corresponding to a Logical Block Address (e.g., LBA-1), Mapping Table 1 associated with LBA-1 needs to be loaded (swapped in) to the Mapping Table Cache 204. As may be seen from table 1, in the example shown in FIG. 2, since the Mapping Tables associated with two adjacent LBAs are different, in order to access the eight Logical Block Addresses, the Mapping Tables need to be repeatedly swapped in and out for eight times, which may lead to higher power consumption and greatly reduce the reading and writing efficiency.

TABLE 1

Example of corresponding relationships between each LBA stored in the LBA Cache and the Mapping Table.

| LBA-1 | Mapping Table 1 |
| LBA-2 | Mapping Table 2 |
| LBA-3 | Mapping Table 1 |
| LBA-4 | Mapping Table 3 |
| LBA-5 | Mapping Table 2 |
| LBA-6 | Mapping Table 4 |
| LBA-7 | Mapping Table 2 |
| LBA-8 | Mapping Table 4 |

In view of the above problems, the present disclosure provides a new sorting systems and/or techniques, and the corresponding relationship between the LBA and the Mapping Table shown in Table 1 will be taken as an example to illustrate the sorting apparatus of the present disclosure.

Figure 3:
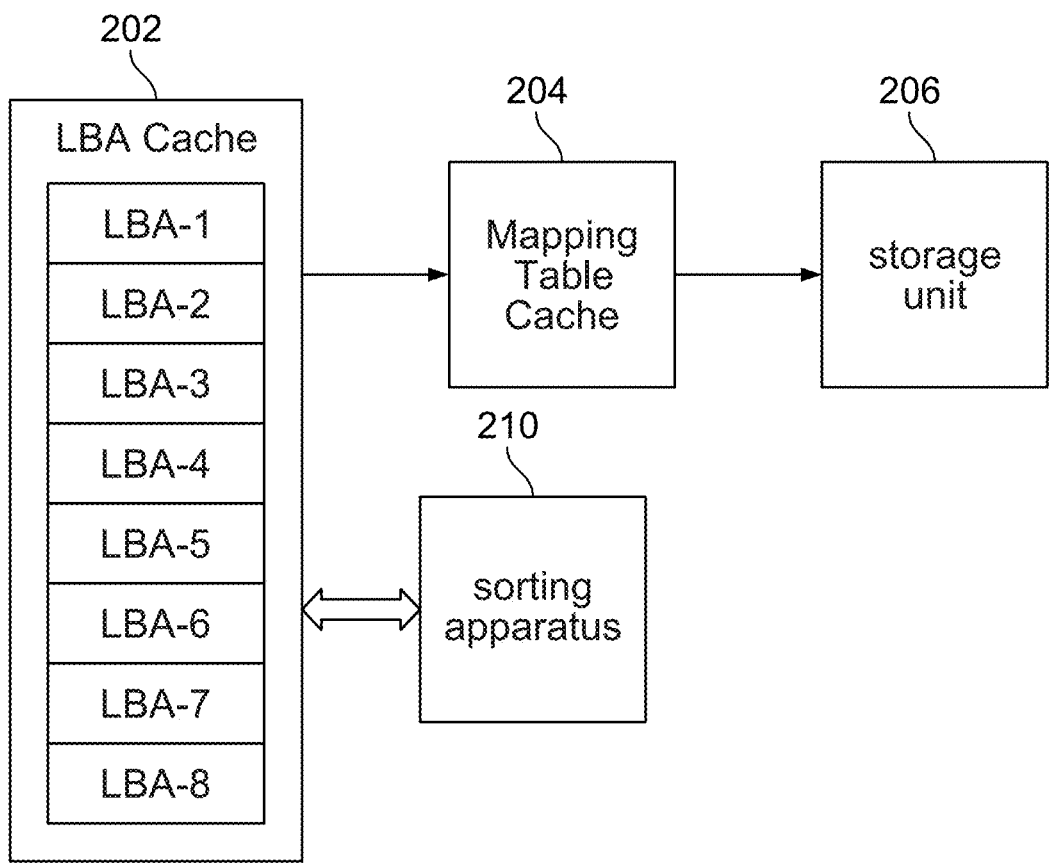
FIG. 3 is an exemplary diagram showing an order of Logical Block Addresses before sorting a plurality of Logical Block Addresses in LBA Cache using a sorting apparatus of the present disclosure.
Figure 4:
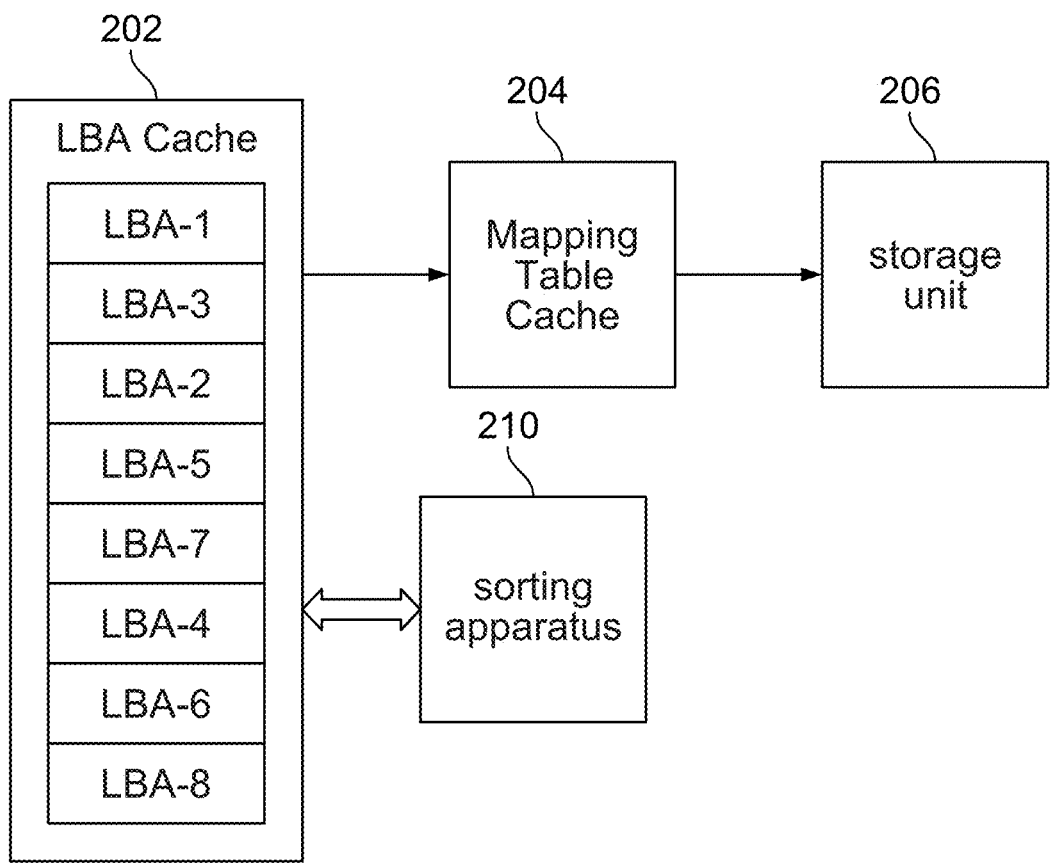
FIG. 4 is an exemplary diagram showing an order of the Logical Block Addresses after sorting a plurality of Logical Block Addresses in LBA Cache using a sorting apparatus of the present disclosure.

FIG. 3 shows an order of the eight Logical Block Addresses LBA-1 to LBA-8 stored in an LBA Cache 202 before sorting by the sorting apparatus 210 (also referred to as a sorting block or a sorting modules), and FIG. 4 shows an order of the eight Logical Block Addresses stored in the LBA Cache 202 after sorting by the sorting apparatus 210 (in at least some embodiments). By comparing FIG. 3 and FIG. 4, the sorting apparatus 210 may sort the Logical Block Addresses in the LBA Cache 202, such that the Logical Block Addresses corresponding to the same Mapping Table are stored in contiguous storage space of the LBA Cache 202 after sorting. For example, after sorting, Logical Block Addresses LBA-1 and LBA-3 corresponding to Mapping Table 1 are stored in a segment of a contiguous storage space in the LBA Cache 202, Logical Block Addresses LBA-2, LBA-5, and LBA-7 corresponding to Mapping Table 2 are stored in a segment of a contiguous storage space in the LBA Cache 202 after the LBA-3, Logical Block Address LBA-4 corresponding to Mapping Table 3 is stored in a storage space in the LBA Cache 202 after the LBA-7, and Logical Block Addresses LBA-6 and LBA-8 corresponding to Mapping Table 4 are stored in a segment of a contiguous storage space in the LBA Cache 202 after the LBA-4.

After the eight Logical Block Addresses in the LBA Cache 202 are sorted, the Mapping Table 1 only needs to be loaded once in the Mapping Table Cache 204 to complete the access to the physical addresses in the storage unit 206 corresponding to the LBA-1 and the LBA-3 associated with the Mapping Table 1. Similarly, the Mapping Table 2 only needs to be loaded once in the Mapping Table Cache 204 to complete the access to the physical addresses in the storage unit 206 corresponding to the LBA-2, the LBA-5, and the LBA-7 associated with the Mapping Table 2, the Mapping Table 3 only needs to be swapped once in the Mapping Table Cache 204 to complete the access to the physical address in the storage unit 206 corresponding to the LBA-4, and the Mapping Table 4 only needs to be swapped once in the Mapping Table Cache 204 to complete the access to the physical addresses in the storage unit 206 corresponding to the LBA-6 and the LBA-8. That is, the physical addresses corresponding to all the eight LBAs may be accessed only by swapping in and out the Mapping Table for four times, so as to greatly reduce the swapping in and out operation of the Mapping Table, reduce the power consumption, and improve the reading and writing efficiency.

It may be understood by those skilled in the art that, for simplicity and clarity, in the above example, the sorting apparatus 210 of the present disclosure is described by taking the sorting of eight LBAs as an example, but the sorting apparatus 210 of the present disclosure may sort more LBAs.

It should be noted that, the above and following descriptions of the apparatus or method for sorting data in the present disclosure are provided by taking the sorting of the Logical Block Addresses as an example, but it may be understood by those skilled in the art that the apparatus or method for sorting data in the present disclosure may also be applied to sorting other types of data besides the Logical Block Address.

In some examples, the data may indicate review information of a product from a consumer on a shopping website, for example, certain fields (e.g., the first two) of the data may indicate a review of a product from consumer to be a "positive comment" (e.g., "11"), a "neutral comment" (e.g., "10"), a "negative comment" (e.g., "01") or "no comment" (e.g., "00"). Thus, after the data are sorted by the apparatus or method for sorting data of the present disclosure, reviews belonging to the "positive comment" out of a plurality of reviews may be collectively displayed, reviews belonging to the "neutral comment" may be collectively displayed, and the like. In addition, the data may also indicate a tag of the product (for example, certain fields of the data may indicate that the product is "food", "daily necessities", "stationery" and the like), a voting result (for example, certain fields of the data may indicate that the voting result is "approval", "disapproval", "abstain" and the like), a delivery address (for example, certain fields of the data may indicate that the delivery address is "Beijing", "Shanghai", "Shandong" and the like), and the like, and for such data with a grouping requirement, the data may be processed using the apparatus or method for sorting data of the present disclosure, so as to achieve fast processing, which will not be enumerated herein.

Specific examples of the structure of the sorting apparatus 210 of the present disclosure will be described below with reference to FIG. 5. Referring to the example of FIG. 5, the sorting apparatus 210 includes a reading unit 211, a group counting unit 212, a writing unit 217, and a control unit 213.

In some embodiments, the reading unit 211 is configured to read data from a cache unit 202. The group counting unit 212 is configured to determine a group to which the data read by the reading unit 211 belongs based on a predetermined grouping rule, and determine a quantity of groups and a quantity of data corresponding to each group. The writing unit 217 is configured to write the data read by the reading unit 211 into the cache unit 202. The control unit 213 is configured to control the reading unit 211, the group counting unit 212, and the writing unit 217 to perform the following operations: operation a): a data is read from a cache unit 202 by controlling a reading unit 211; operation b): a group to which the data read by the reading unit 211 belongs is determined by controlling a group accounting unit 212 based on a predetermined grouping rule; operation c): operation a) and the operation b) are performed for a plurality of times by controlling the reading unit 211 and the group counting unit 212; operation d): after determining, by the group counting unit 212, groups to which a plurality of data belong, a quantity of the groups and a quantity of data corresponding to each group are determined by controlling the group counting unit 212; and operation e): the plurality of data are sequentially read from the cache unit 202 again by controlling the reading unit 211, and the plurality of data are written into the cache unit 202 by controlling a writing unit 217, wherein data belonging to a same group are written into a contiguous storage space of the cache unit 202.

In some embodiments, the sorting apparatus 210 further includes a reading pointer storage unit 214, a plurality of counters 215, and a writing pointer storage unit 216. The reading pointer storage unit 214 is configured to store a reading pointer indicating a storage location of data in the cache unit 202. The plurality of counters 215 are configured to count the quantity of the data corresponding to each group, respectively. The writing pointer storage unit 216 is configured to store a plurality of writing pointers, each writing pointer indicates a different writing location in the cache unit.

In some embodiments, the reading unit 211, the group counting unit 212, the control unit 213, and the writing unit 217 may be implemented by a hardware circuit. In some other embodiments, the reading unit 211, the group counting unit 212, the control unit 213, and the writing unit 217 may be implemented by a combination of a hardware circuit with firmware and/or software. In addition, in the example of FIG. 5, the reading pointer storage unit 214, the plurality of counters 215, the writing pointer storage unit 216, and the cache unit 202 may be a static random access memory.

In some embodiments, the reading pointer storage unit, the plurality of counters, the writing pointer storage unit, and the cache unit are (also) a dynamic random access memory, a flash memory, or other suitable memory.

In addition, the present disclosure also provides a method for sorting data, the method includes the following steps: a) a data is read from a cache unit; b) a group to which the data read in step a) belongs is determined based on a predetermined grouping rule; c) step a) and step b) are repeated for a plurality of times; d) after determining groups to which a plurality of data belong, a quantity of the groups and a quantity of data corresponding to each group are determined; and e) data belonging to a same group is written into a contiguous storage space of the cache unit by sequentially reading the plurality of data from the cache unit again, and sequentially writing the plurality of data into the cache unit. Referring to the above description of FIG. 5, the above steps a)-e) may be performed by the reading unit 211, the group counting unit 212, and the writing unit 217 that are controlled by the control unit 213 in FIG. 5.

An embodiment of a method for sorting data according to the techniques described herein and a function of each unit in the above sorting apparatus is further described in FIGS. 6 to 9.

Figure 6:
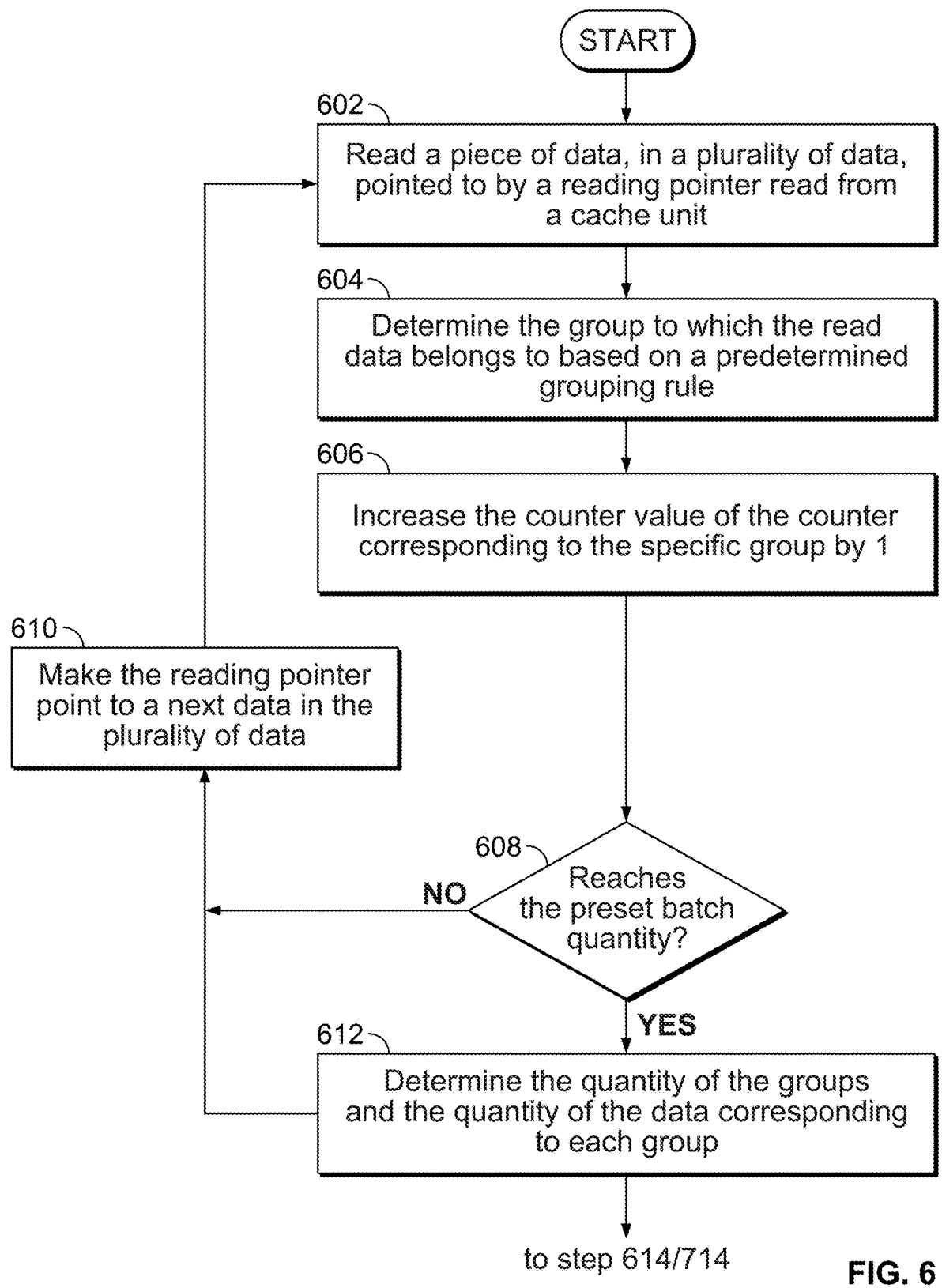
FIGS. 6 and 7 are flowcharts showing methods for sorting data according to some embodiments of the present disclosure.
Figure 7:
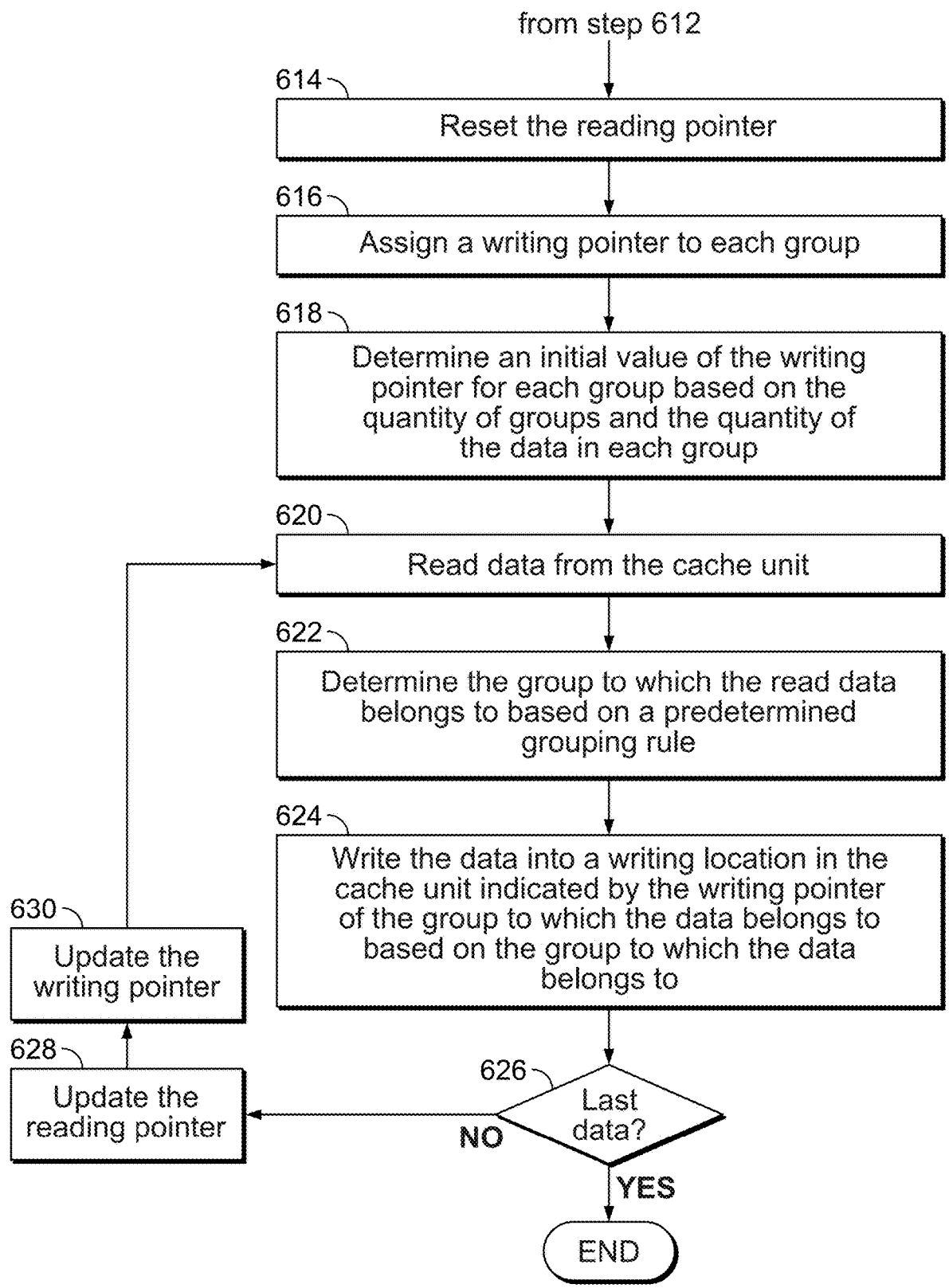

Referring to FIGS. 6 and 7, which are flowcharts showing methods for sorting data in some embodiments of the present disclosure. As illustrated, the method includes steps 602 to 630.

Step 602: a data is read from a plurality of data pointed by a reading pointer read from the cache unit.

Figure 5:
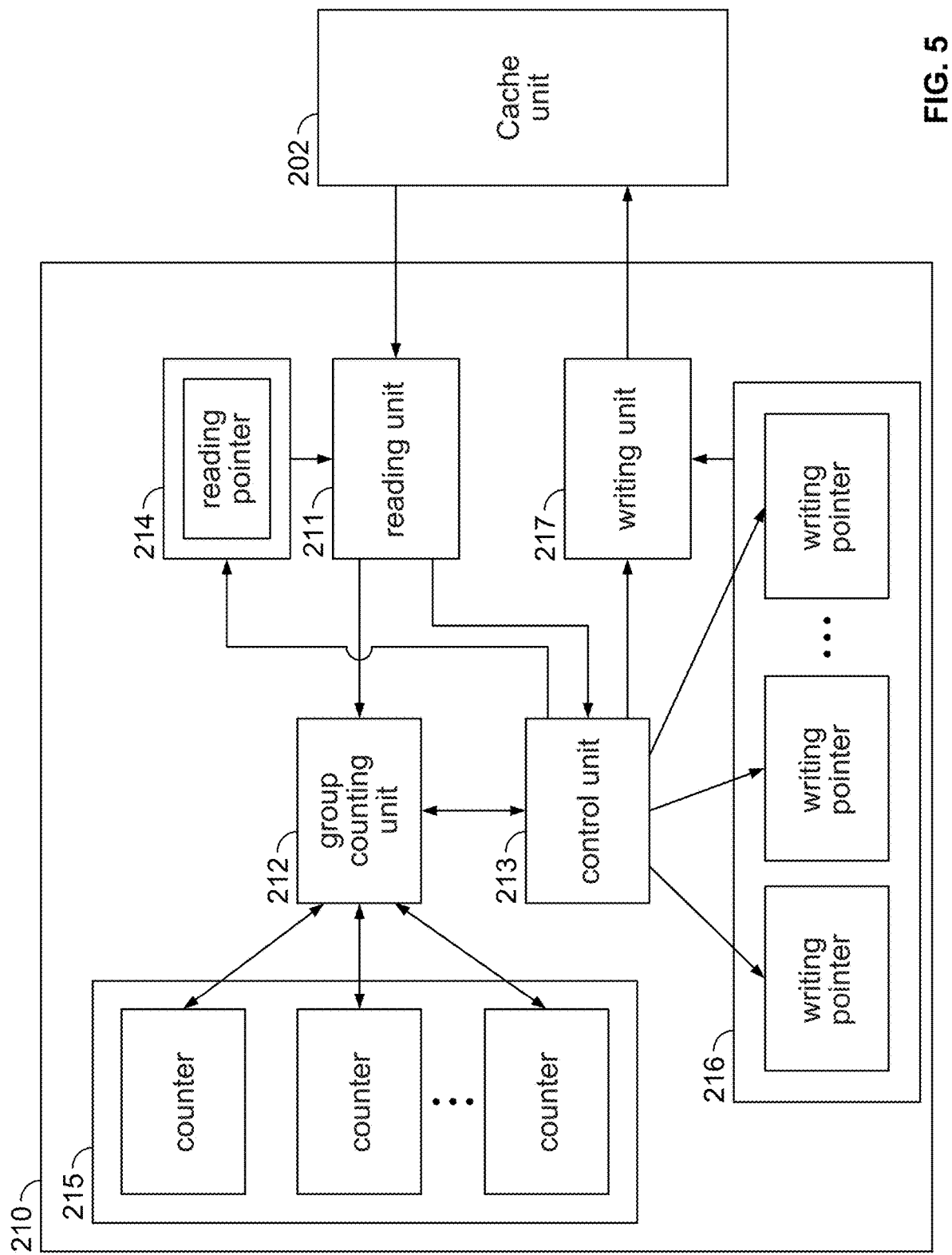
FIG. 5 shows a structural block diagram showing an apparatus for sorting data according to some embodiments of the present disclosure.

For example, a reading pointer is stored in the reading pointer storage unit 214 in FIG. 5, and when the reading pointer has a preset initial value, the reading pointer points to a first data of the plurality of data to be sorted which are stored in the cache unit 202. For example, in the embodiment shown in FIG. 3, when the reading pointer has an initial value, the reading pointer points to a first Logical Block Address LBA-1. In this case, the reading unit 211 may read the first Logical Block Address LBA-1 pointed to by the reading pointer from the cache unit 202.

Step 604: a group to which the data read in step 602 belongs is determined based on a predetermined grouping rule.

In some embodiments, the predetermined grouping rule includes: determining the group to which the data belongs based on an identification field with a predetermined length at a predetermined location of the data, in which data with the same identification field are determined to belong to the same group. In some embodiments, a location and a length of the identification field may be specified by a user, for example, determined based on a rule instruction received from the user. In some embodiments, the rule instruction includes a binary number having the same number of bits as the data; a code bit of the binary number having a value of 1 corresponds to the identification field. In some embodiments, the rule instruction includes a binary number having the same number of bits as the data, and a code bit of the binary number having a value of 0 corresponds to the identification field.

For example, the data to be sorted read in step 602 is a 32-bit binary number, and the rule instruction received from the user includes a 32-bit mask, and the 32-bit mask specifies an identification field with a predetermined length at a predetermined location in the data to be sorted. In one example, the 32-bit mask included in the rule instruction received from the user is expressed as 0000000F in hexadecimal, and that is, the lowest 4 bits of the 32-bit mask are 1 and other bits are 0. Thus, the lowest 4 bits of the 32-bit data to be sorted read in step 602 may be designated as the identification field through the 32-bit mask. Different identification fields may be used to indicate different groups such that different data to be sorted may be divided into up to 16 (i.e., 24) groups using the 4-bit identification field.

In another example, a 32-bit mask included in a rule instruction received from the user is expressed as C0000000 in hexadecimal, and that is, the highest 3 bits of the 32-bit mask are 1. Thus, different data to be sorted may be divided into up to 8 (i.e. 23) groups using the mask.

In yet another example, the data to be sorted read in step 602 is a 32-bit binary Logical Block Address, and the rule instruction received from the user includes a 32-bit mask, which is expressed as FFFF8000 in hexadecimal, and that is, the upper 17 bits of the 32-bit mask are 1, and the lower 15 bits are 0. If each LBA indicates a logical block with 512 bytes in size, the different Logical Block Addresses may be divided into up to 217 groups using the mask, and each group indicates a logical block space with 16 MB (i.e., 215*512B=16 MB).

Based on this, when the Solid State Disk processes a specific storage block (e.g., garbage collection), the Logical Block Address of each group may be directly provided to each instance of a garbage collection process for processing.

It should be noted that, in the above embodiments, although the predetermined grouping rule is described by way of example, it may be understood that those skilled in the art may make different modifications or changes to the predetermined grouping rule of the above examples, so as to meet different application scenarios and requirements.

Figure 8:
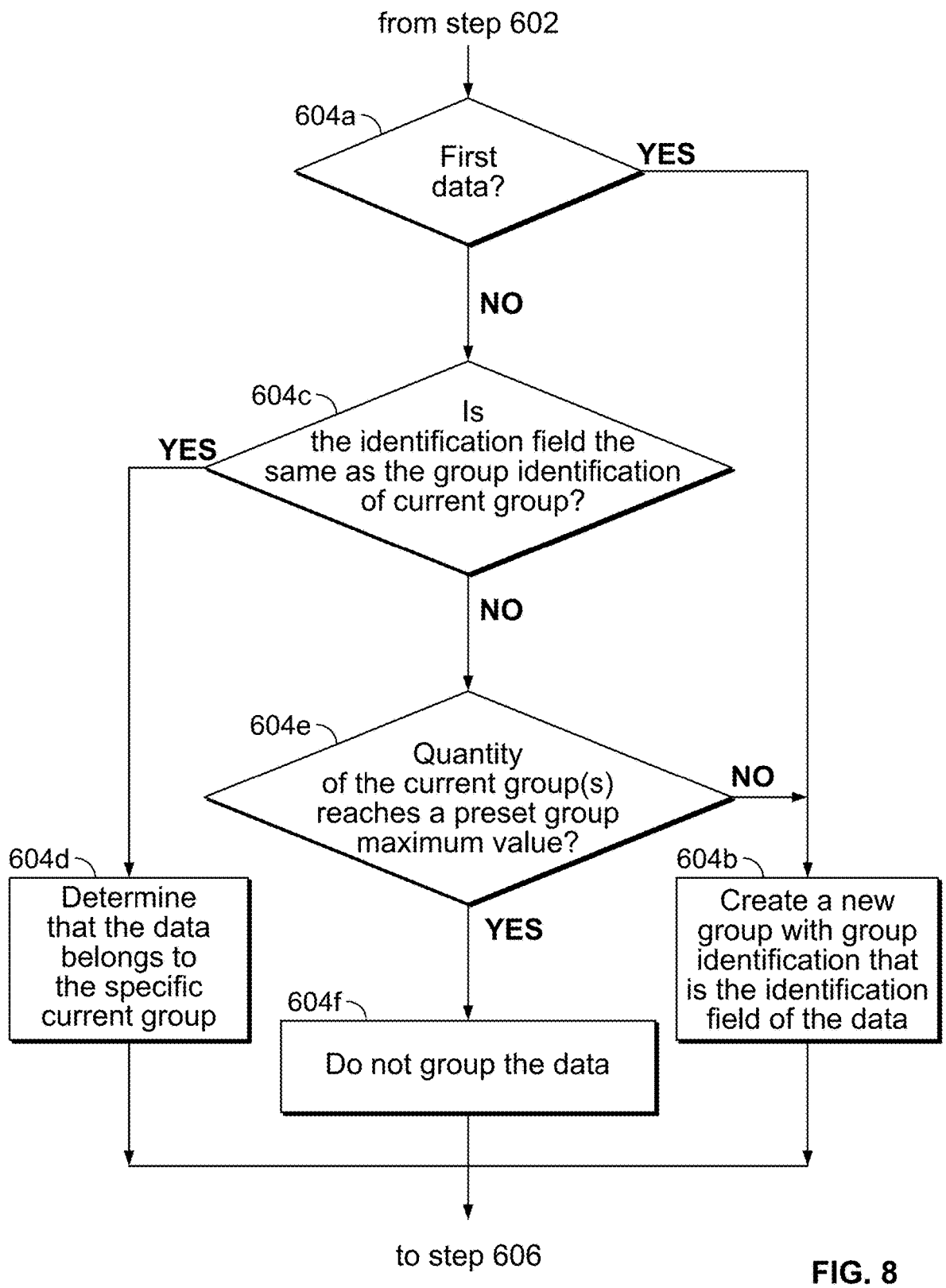
FIG. 8 shows sub-steps of step 604 in the flowchart of the method for sorting data shown in FIG. 6.

In some embodiments, referring to FIG. 8, the step 604 that the group to which the data read in step 602 belongs is determined based on the predetermined grouping rule, includes sub-steps 604a to 604f.

Specifically, as shown in FIG. 8, in step 604a: whether the data read from the cache unit is a first data of the plurality of data to be sorted is judged. If the data is the first data of the plurality of data, step 604b is performed, a new group for the first data is created, an identification field of the first data is determined as a group identification of the new group, and the first data is determined to belong to the new group. If the data is not the first data of the plurality of data, step 604c is performed, an identification field of the data is compared to a group identification of a current group. If the identification field of the data is the same as the group identification of a specific current group, step 604d is performed, the data is determined to belong to the specific current group. If the identification field of the data is different from the group identifications of all the current groups, step 604e is performed, whether a quantity of the current groups reaches a preset group maximum value is judged. If the quantity of the current groups does not reach the preset group maximum value, step 604b is performed, a new group whose group identification is determined as the identification field of the data is created, and the data is determined to belong to the new group; and if the quantity of the current groups reaches the preset group maximum value, step 604f is performed, the determination of a group to which the data belongs is not performed.

In some embodiments, the preset group maximum value may be determined based on a total quantity of available counters in the sorting apparatus 210. This is because each group needs to be assigned with a corresponding counter in a subsequent step, so as to count a quantity of data in the group. However, the quantity of counters configured in the hardware system is limited. If the quantity of the current groups reaches a top limit of the quantity of counters, which means that all counters have been assigned, there is no counter assigned for a new group. Thus, the data needs not to be grouped. That is, the preset group maximum value may be equal to the total quantity of available counters in the sorting apparatus 210. However, it may be understood by those skilled in the art that the preset group maximum value may be less than the total quantity of available counters of the sorting apparatus 210. For example, a user may specify the preset group maximum value to be any quantity that is less than the total quantity of available counters in the sorting apparatus 210 through a rule instruction.

Consider FIG. 3 as an example. Assuming that the eight Logical Block Addresses LBA-1 to LBA-8 to be sorted stored in the cache unit 202 are the 32-bit binary number, and values of the respective lowest 4 bits are shown in Table 2 below; and the 32-bit mask in the rule instruction received from the user is 0000000F, and the mask indicates that the lowest 4 bits of LBA-1 to LBA-8 are used as the identification fields to determine the groups to which the eight Logical Block Addresses belong.

Returning to FIG. 6, in step 604, whether the data read from the cache unit 202 is a first data LBA-1 of the data to be sorted is judged first. If the read data is the first data LBA-1, a new group for the LBA-1 is created, and the identification field "0001" (i.e., value of the lowest 4 bits of the LBA-1) of the LBA-1 is determined as the group identification of the group, and the LBA-1 is determined to belong to the new group. If the data read from the cache unit 202 is not the first data LBA-1 of the eight data to be sorted, but, for example, LBA-2, the identification field "0010" of LBA-2 (i.e., value of the lowest 4 bits of LBA-2) is compared to the group identification "0001" of the current group, it may be determined that the identification field of LBA-2 is different from the group identification "0001" of the current group, a new group with the identification field "0010" of LBA-2 as the group identification is created, and LBA-2 is determined to belong to the new group. Further, assuming that the data read from the cache unit 202 is LBA-3, the identification field "0001" (i.e., value of the lowest 4 bits of LBA-3) of LBA-3 is compared to the group identification "0001" or "0010" of the current groups, and it may be determined that the identification field of LBA-3 is the same as the group identification "0001" of the current group, and it may be determined that LBA-3 belongs to the group with the group identification "0001". In same manner, similar operations may be performed on the subsequent read data LBA-4 to LBA-8.

In one example, assuming that the preset group maximum value is 3, and assuming that the data LBA-1 to LBA-5 has been grouped, and three groups identified by "0001", "0010", and "0011" have been created. If the data read from the cache unit 202 by the reading unit 211 is LBA-6, the identification field "1000" of the data LBA-6 is compared to the group identifications "0001", "0010", and "0011" of the current three groups, and it may be found that the identification field of the data LBA-6 is different from any one of the group identifications of the current three groups is the same as. However, a quantity of the current groups reaches the preset group maximum value 3, which means that a new group cannot be created for the data LBA-6 anymore, and the operation of creating a new group for data LBA-6 needs not to be performed.

In another example, assuming that the preset group maximum value is equal to 6 and the quantity of the current groups does not reach the preset group maximum value, a new group may be created for the data LBA-6. For example, a new group whose group identification is determined as the identification field "1000" of LBA-6 is created, and LBA-6 is determined to belong to the new group.

TABLE 2

Example of the last 4 bits of each LBA stored in the LBA Cache

| LBA-1 | 0001 |
| LBA-2 | 0010 |
| LBA-3 | 0001 |
| LBA-4 | 0011 |
| LBA-5 | 0010 |
| LBA-6 | 1000 |
| LBA-7 | 0010 |
| LBA-8 | 1000 |

Step 606: a counter value of a counter corresponding to a specific group is controlled to increase by 1. For example, the sorting apparatus 210 in FIG. 5 includes a plurality of counters 215, and the group counting unit 212 may assign a counter with an initial count value of 0 to each group. If the group counting unit 212 determines that a data belongs to a specific group, it controls the counter value of the counter corresponding to the specific group to be increased by 1.

Step 608: whether a quantity of read data reaches a preset batch quantity. If not, proceed to step 610 and in turn repeat steps 602 to 606; if so, proceed to step 612.

In some embodiments, a preset batch quantity may be included in the rule instruction obtained from the user, the preset batch quantity indicates a total quantity of data to be processed for each execution of the method for sorting data. If the quantity of the read data reaches the preset batch quantity, indicating that processing of all the data to be sorted has not been completed, and other unprocessed data to be sorted still need to be read from the cache unit until all the data to be sorted are processed. The preset batch quantity may be arranged by those skilled in the art based on different application scenarios and requirements, such as, 1K (1024), 4K (4096), 8K (8192), 16K (16384), or other suitable values.

It should be noted that, when the preset batch quantity is arranged, a maximum count value of the counter 215 needs to be considered. Generally, the count value of a counter is not infinite, but has a top limit, and a specific value of the count value is related to a type of counter. For example, a maximum count value of an 8-bit counter is 256, a maximum count value of a 10-bit counter is 1024, and a maximum count value of a 16-bit counter is 65536. To ensure that the counter does not overflow under extreme conditions (e.g., all data of a certain batch quantity belong to a same group), a counter with a relatively large maximum count value is typically selected and a value of the batch quantity is arranged to equal to or less than the maximum count value of the counter. In some embodiments, all counters are of the same type. In some embodiments, one or more of the plurality of counters are of a different type from each other, i.e. their maximum count values are different; in this case, the value of the batch quantity may be arranged to be equal to or less than the smallest maximum count value in the plurality of counters, to avoid an overflow during the subsequent counting.

Step 610: the reading pointer is updated to point to a next data of the plurality of data. In some embodiments, reading includes a-1) reading the data, of the plurality of data, pointed by a reading pointer read from the cache unit; a-2) causing the reading pointer to point to a next data of the plurality of data, and a-3) repeating the steps a-1) and a-2) until the plurality of data are read.

Taking the eight LBAs of FIG. 3 as an example, after the reading pointer is updated, the reading pointer originally pointing to the first Logical Block Address LBA-1 is updated to point to the second Logical Block Address LBA-2, and then proceed to step 602 to read the next data LBA-2, and then the processing of steps 604 and 606 are performed sequentially, and so on until all eight LBAs have been processed.

Continuing with the example of FIG. 3, there are eight data LBA-1 to LBA-8 stored in the LBA Cache 202, assuming that a preset batch quantity is 8 and the quantity of available counters is 3, and thus the preset group maximum value is also 3. As described in step 604, the identification field of the data LBA-6 is found to be different from any one of the group identifications of the three current groups, and the quantity of the current groups reaches the preset group maximum value 3, while the operation of determining the group to which the LBA-6 data belongs is not performed. However, since the quantity of the read data (i.e., 6) does not reach the preset batch quantity (i.e., 8), the method of the present disclosure does not stop, but continues to update the reading pointer to point to the next data LBA-7 of the plurality of data. Since the identification field "0010" of the data LBA-7 is the same as the group identification of the current second group, it is determined in step 604d that the data LBA-7 belongs to the second group, i.e., belongs to the same group as data LBA-2. Thereafter, the reading of data LBA-8 will be continued. However, since the identification field "1000" of the data LBA-8 is different from any one of the group identifications of the current three groups, the data LBA-8 is not grouped similarly to the data LBA-6.

After the above operations, all of the eight data LBA-1 to LBA-8 have been traversed, it may be ensured that all data belonging to the current groups in the eight data are found and divided into the corresponding group (e.g., it is determined that data LBA-2, LBA-5, and LBA-7 belong to the same group). For the data (e.g., LBA-6 and LBA-8) not grouped since the quantity of the current groups reaches the preset group maximum value, after the data (e.g., LBA-1 to LBA-5, and LBA-7) that already have been grouped are sorted by the method of the present disclosure, the method of the present disclosure may be performed again to sort non-grouped data for the second or more rounds, thereby completing the sorting of all data of the preset batch quantity.

In another example, assuming that the preset group maximum value is equal to 6, the sorting may be completed for all eight data LBA-1 to LBA-8 in one round of sorting, which will not be described herein.

Step 612: a quantity of all the groups and a quantity of the data corresponding to each group are determined, thereby completing the first traversal processing of the preset batch quantity of the data. In some embodiments, a total quantity of assigned counter may be counted and determined as a quantity of groups; and a count value of each assigned counter is counted and determined as a quantity of the data in the group corresponding to the counter.

Continuing with the example of FIG. 3, the cache unit 202 stores eight 32-bit Logical Block Addresses LBA-1 to LBA-8 to be sorted, and the 32-bit mask in the rule instruction received from the user is 0000000F. Referring to the above Table 2, assuming that the preset group maximum value is equal to 6, after the operations of steps 602 to 610, each of the lowest 4 bits of LBA-1 and LBA-3 is 0001, LBA-1 and LBA-3 may be determined to belong to a first group with the group identification "0001", and a value of the counter corresponding to the group is 2. Each of the lowest 4 bits of LBA-2, LBA-5, and LBA-7 is 0010, and LBA-2, LBA-5, and LBA-7 may be determined to belong to a second group with the group identification "0010", and a value of the counter corresponding to the group is 3. The lowest 4 bits of LBA-4 is 0011, and LBA-4 is individually determined to belong to a third group with the group identification "0011", and a value of the counter corresponding to the group is 1. Each of the lowest 4 bits of LBA-6 and LBA-8 is 1000, and LBA-6 and LBA-8 may be determined to belong to a fourth group with the group identification "1000", and a value of the counter corresponding to the group is 2. That is, the eight Logical Block Addresses LBA-1 to LBA-8 to be sorted are determined to belong to four groups respectively, and the quantity of Logical Block Addresses corresponding to the four groups are 2, 3, 1, and 2, respectively.

In another example, assuming that the preset group maximum value is equal to 3, after the operations of steps 602 to 610, similarly, LBA-1 and LBA-3 are determined to belong to the first group with the group identification "0001", and the value of the counter corresponding to the group is 2; LBA-2, LBA-5, and LBA-7 are determined to belong to the second group with the group identification "0010", and the value of the counter corresponding to the group is 3; LBA-4 is determined to belong to the third group with the group identification "0011", and the value of the counter corresponding to the group is 1; and LBA-6 and LBA-8 belong to the non-grouped data since the quantity of the current groups reaches the preset group maximum value.

With continued reference to FIG. 7, the method of the present disclosure proceeds to step 614.

Step 614: the reading pointer is reset, i.e. a value of the reading pointer is reset as the initial value of step 602, i.e. the reading pointer points to the first data of the plurality of data to be sorted, so as to perform a second traversal and operation on the plurality of data.

Step 616: a writing pointer is assigned to each group.

For example, the sorting apparatus 210 of FIG. 5 includes a writing pointer storage unit 216 configured to store a plurality of writing pointers. The control unit 213 assigns a writing pointer to each of the groups determined in step 612. For example, the control unit 213 assigns a first writing pointer to the first group with the group identification "0001"; assigns a second writing pointer to the second group with the group identification "0010"; assigns a third writing pointer to the third group with the group identification "0011"; and assigns a fourth writing pointer to the fourth group with the group identification "1000".

In addition, if there is non-grouped data in the first traversal operation since the quantity of the current groups reaches the preset group maximum value, a writing pointer is also assigned to these non-grouped data.

Step 618: determining an initial value of the writing pointer for each group.

In some embodiments, the initial value of the writing pointer of the first group may be a preset value. For example, the preset value may be included in a rule instruction acquired from a user, such that the initial value of the writing pointer of the first group may be determined based on the rule instruction acquired from the user. Next, for each subsequent group after the first group, an initial value of a writing pointer of the subsequent group is determined based on the initial value of the writing pointer of the previous group and the quantity of data in the previous group.

In one example, assuming that the preset group maximum value is equal to 6, a quantity of groups determined in step 612 is 4, a quantity of the data in the first group is 2, a quantity of the data in the second group is 3, a quantity of the data in the third group is 1, and a quantity of the data in the fourth group is 2. Assuming that an initial value of a writing pointer of a first group is a preset value A, it may be determined that an initial value of a writing pointer of a second group is A+2, an initial value of a writing pointer of a third group is A+2+3, and an initial value of a writing pointer of a fourth group is A+2+3+1.

In another example, assuming that the preset group maximum value is 3, the quantity of the groups determined in step 612 is 3, a quantity of the data in a first group is 2, a quantity of data in a second group is 3, and a quantity of data in a third group is 1. In addition, there are grouped data LBA-6 and LBA-8. Similarly, assuming that an initial value of the writing pointer of the first group is a preset value A, it may be determined that an initial value of a writing pointer of a second group is A+2, and an initial value of a writing pointer of a third group is A+2+3; and an initial value of a writing pointer assigned to the non-grouped data is A+2+3+1. When the method of the present disclosure needs to be performed again to sort the above non-grouped data for the second or more rounds, the initial value of the writing pointer of the above non-grouped data may be used as an initial value of a reading pointer for indicating a storage location of the non-grouped data in the cache unit.

Step 620: a data is read from the cache unit.

Step 622: a group to which the read data belongs is determined based on a predetermined grouping rule.

Regarding steps 620 and 622, the operations are similar to that of steps 602 and 604, which will not be described herein.

Step 624: the data is written into a writing location in the cache unit based on a group to which the data belongs, wherein the writing location is indicated by a writing pointer of the group to which the data belongs.

Specifically, since the initial value has been determined for the writing pointer of each group in step 618, the data read in step 620 is directly written into an address pointed by the writing pointer corresponding to the group in the cache unit 202 after its group is determined, such that the data in the same group is written into a contiguous storage space of the cache unit 202.

When there are non-grouped data, a writing pointer is also assigned to the non-grouped data in step 618, and the initial value of the writing pointer is determined, the non-grouped data may also be written into a contiguous memory space of the cache unit 202.

Step 626: whether the data is a last data of the plurality of data is judged. If yes, it indicates that all the plurality of data have been sorted, and the method may end; if not, steps 628 and 630 are performed and step 620 is returned to continue sorting for other data.

In some embodiments, an offset value of a current reading pointer (i.e., a difference between the current value of the reading pointer and the initial value of the reading pointer) may be compared to the preset batch quantity. If the offset value of the current reading pointer is less than the preset batch quantity, it indicates that the current data is not the last data of the plurality of data, steps 630 and 632 need to be performed to continue reading data from the cache unit 202. If the value of the current reading pointer is equal to the preset batch quantity, it indicates that the current data is the last data in the plurality of data, and the processing of all the plurality of data is completed.

In step 628, the writing pointer is updated such that the writing pointer indicates a next writing location in the cache location.

In step 630, the reading pointer is updated such that the reading pointer indicates a next reading location in the cache location.

The orders of steps 628 and 630 may be exchanged with each other or performed simultaneously. By updating the writing pointer and the reading pointer, the next data in the plurality of data may be read in step 620 in the subsequent operation and written into the corresponding location of the cache unit in step 624 until all the data is sorted.

Figure 9:
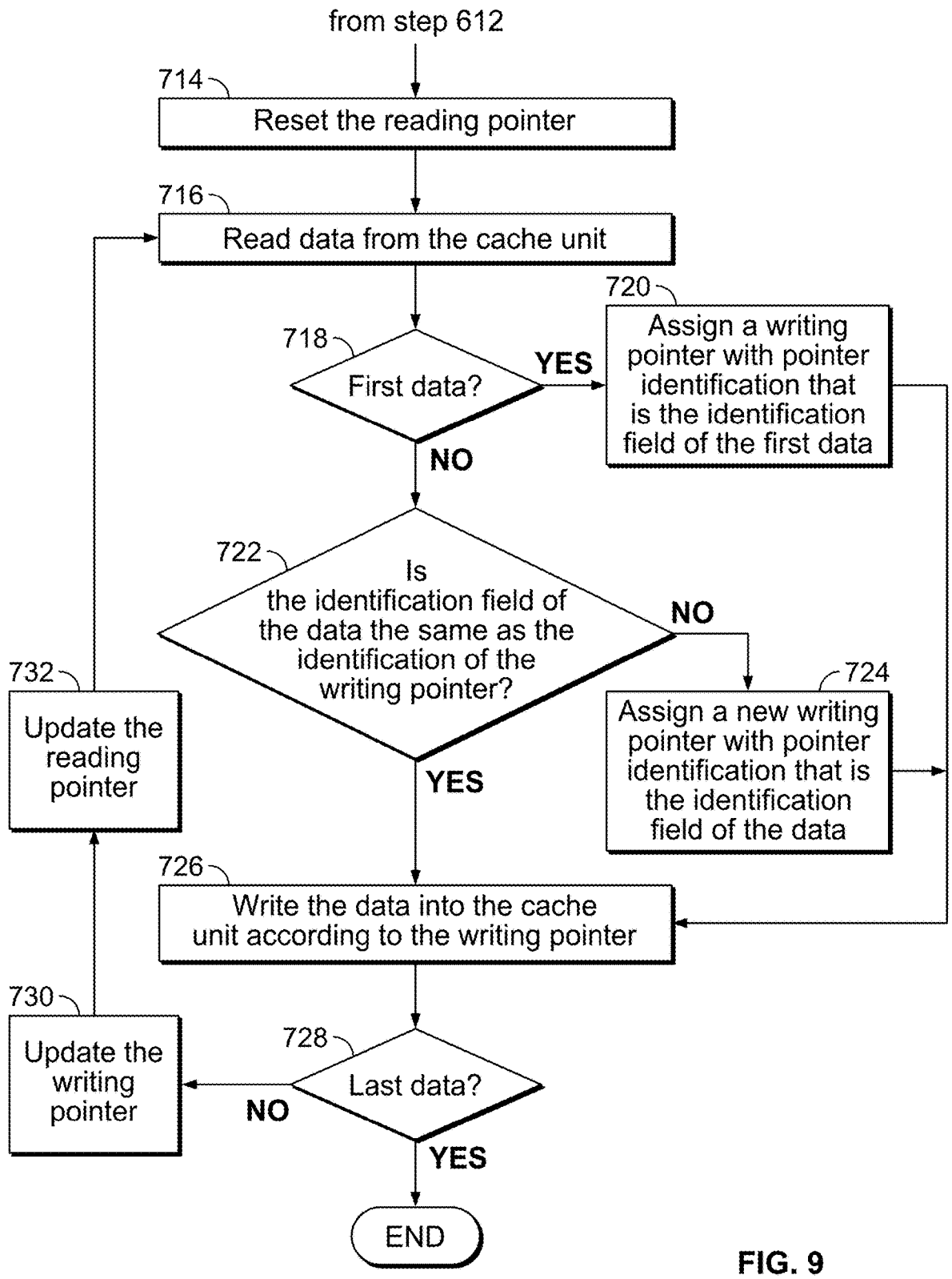
FIG. 9 shows a flowchart showing a method for sorting data according to some other embodiments of the present disclosure.

Referring to FIG. 9, some other embodiments of the method for performing a second traversal and operation on a plurality of data are described. Steps 714 to 732 shown in FIG. 9 may implement a similar function as steps 614 to 630 shown in FIG. 7, and that is the plurality of data stored in the cache unit are written into the storage units by group. Specific operations of each step shown in FIG. 9 are described below.

Step 714: the reading pointer is reset.

Step 716: a data is read from a cache unit.

Step 718: whether the data read from the cache unit is a first data of a plurality of data is judged. If yes, step 720 is performed; if not, step 722 is performed.

Step 720: a writing pointer is assigned to the first data of the plurality of data, and an identification field of the first data is determined as a pointer identification of the writing pointer. An initial value of the writing pointer corresponding to the first data is a preset value, and the preset value may be determined based on a rule instruction received from a user.

For example, if the data read from the cache unit 202 is a first data LBA-1 in the data to be sorted, a writing pointer is assigned to LBA-1, and an identification field "0001" of LBA-1 is used as a pointer identification of the writing pointer, and the writing pointer may be referred to as a first writing pointer with a preset initial value.

Step 722: when the data read in step 716 is not the first data of the plurality of data, an identification field of the data is compared to a pointer identification of a current writing pointer. If the identification field of the data is the same as the pointer identification of a specific current writing pointer, step 726 is performed; if the identification field of the data is different from the pointer identification of the current writing pointer, step 724 is performed.

Step 724: a new writing pointer whose pointer identification is determined as the identification field of the data is assigned to the data. An initial value of the new writing pointer is determined based on a sum of the initial value of the writing pointer corresponding to the first data and the quantity of the data in each group corresponding to all the current writing pointers.

For example, if the data read from the cache unit 202 is not the first data LBA-1 in the data to be sorted, but LBA-2, the identification field "0010" of LBA-2 is compared to the pointer identification "0001" of the current first writing pointer, and it may be determined that the identification field of LBA-2 is different from the pointer identification "0001" of the first writing pointer, step 724 is performed, a new writing pointer, i.e., a second pointer, is assigned to LBA-2, the new writing pointer whose pointer identification is determined as the identification field "0010" of LBA-2. An initial value of the second writing pointer is determined based on the initial value of the first writing pointer and the quantity of data in the first group corresponding to the first writing pointer. For example, assuming that the initial value of the first writing pointer is A and the quantity of data in the first group is 2, the initial value of the second writing pointer is A+2. If the data read from the cache unit 202 is LBA-3, the identification field "0001" of LBA-3 is compared to the pointer identification "0001" of the current first writing pointer and the pointer identification "0010" of the second writing pointer, and it may be determined that the identification field of LBA-3 is the same as the pointer identification "0001" of the current first writing pointer, such that the subsequent step 726 may be performed, the writing operation on LBA-3 is completed based on the value of the first writing pointer. In same manner, similar operations may be performed on the subsequent read data LBA-4 to LBA-8.

It should be noted that, assuming that the data read from the cache unit 202 includes non-grouped data, and when the quantity of the assigned writing pointers is equal to the quantity of groups, for the non-grouped data, the identification field of the non-grouped data is different from the pointer identification of the current writing pointer, a new writing pointer may be assigned to the non-grouped data, and an initial value of the writing pointer is determined based on the initial value of the first writing pointer and the quantity of all grouped data. Continuing with the example of eight data LBA-1 to LBA-8 in FIG. 3, and assuming that the preset group maximum value is 3, the grouped data are LBA-1 to LBA-5 and LBA-7, and the non-grouped data are LBA-6 and LBA-8, an initial value of the writing pointer assigned to the non-grouped data is the initial value of the first group plus 6.

Step 726: the data is written into the cache unit based on the corresponding writing pointer.

Step 728: whether the data is the last data of the plurality of data is judged. If yes, it indicates that all the plurality of data is sorted, and the method may end; if not, steps 730 and 732 are performed to continue sorting other data.

Step 730: the writing pointer is updated such that the writing pointer indicates a next writing location in the cache unit.

Step 732: the reading pointer is updated such that the reading pointer indicates a next reading location in the cache unit.

The orders of steps 730 and 732 may be exchanged with each other or performed simultaneously.

The operations of steps 714, 716, 728, 730 and 732 in FIG. 9 are similar to steps 614, 620, 626, 628 and 630 in FIG. 7, respectively, which will not described herein.

Figure 10:
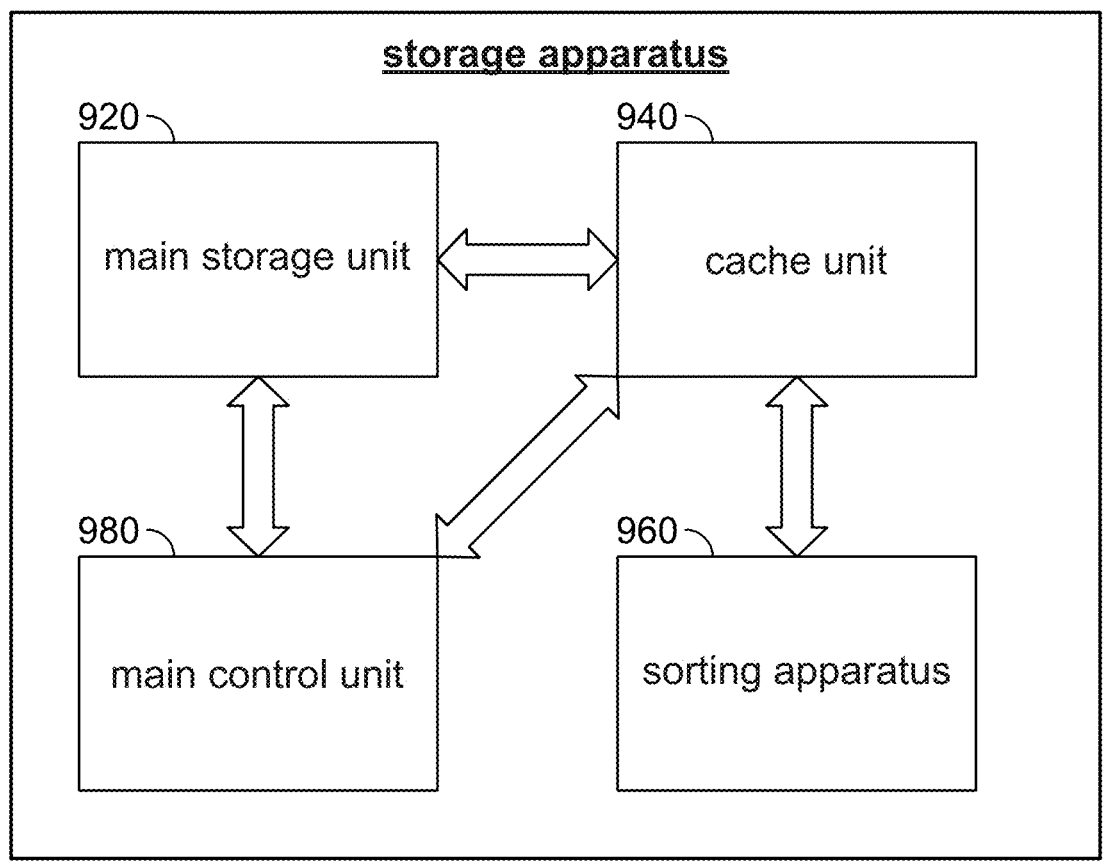
FIG. 10 shows a structural block diagram of a storage apparatus according to some embodiments of the present disclosure.

As shown in FIG. 10, embodiments of the present disclosure further provide a storage apparatus (also referred to as a storage system). The storage apparatus includes: a main storage unit 920, a cache unit 940, a sorting apparatus (also referred to as a sorting system) 960, and a main control unit 980. The main storage unit 920 may include a non-volatile storage medium, such as a flash memory, a magnetic disk, and the like; the cache unit 940 is configured to cache a plurality of data from a Host, and may be a static random access memory, a dynamic random access memory, a flash memory, or other suitable memories; the sorting apparatus 960 is used to write the data belonging to a same group into a contiguous storage space of the cache unit 940 again after grouping the plurality of data in the cache unit 940; the main control unit 980 is configured to access the main storage unit 920 based on the sorted data stored in the cache unit 940. With regard to the specific structures and functions of the storage apparatus, reference may be made to the method and apparatus for sorting data described above in conjunction with FIGS. 3 to 9, which will not be described herein.

An apparatus for sorting data is further provided, and includes a processor; a memory configured for storing executable instructions for the processor; the processor is configured to execute the instructions to implement the following operations: a) reading a data from a cache; b) determining a group to which the data belongs based on a predetermined grouping rule; c) repeating the steps a) and b) for a plurality of data; d) determining a quantity of groups and a quantity of data corresponding to each group; and e) writing data belonging to a same group into a contiguous storage space of the cache by sequentially reading the plurality of data from the cache again, and sequentially writing the plurality of data into the cache.

With regard to the specific structures and functions of the apparatus, reference may be made to the method for sorting data described above in conjunction with FIGS. 3 to 9, which will not be described herein.

It should be noted that, the above-described embodiments of the apparatus or system are merely illustrative. For example, the division of the units is only a logical function division, and other division manners may be available in actual implementation. For example, a plurality of units or components may be combined or integrated into another system, or some features may be omitted, or may not be performed. Further, the coupling or direct coupling, or communication connection between the units shown or discussed may be implemented by some interfaces, and indirect coupling or communication connection between the apparatus or units may be electrical, or in other forms. The unit described as a separate component may or may not be physically separated, and the component shown as a unit may or may not be a physical unit, may be located in one place or may be distributed in a plurality of network units. Some or all of the units may be selected according to actual requirements to achieve the purpose of the solution of the embodiment. In addition, the steps of the method described above may be omitted or added as needed. In addition, a plurality of steps may be performed simultaneously or sequentially, and when a plurality of different steps is performed sequentially, and the order in which they are performed may also vary in different embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a logical block address (LBA) cache memory circuit that stores a plurality of logical block addresses (LBAs) received from a host;
a mapping table cache memory circuit having a size, wherein:
the mapping table cache memory circuit stores at least one of a plurality of mapping tables;
the plurality of mapping tables stores mapping information between the plurality of LBAs and a plurality of physical addresses on a solid state storage; and
the size of the mapping table cache memory circuit is strictly smaller than a sufficient size to simultaneously store all of the plurality of mapping tables; and
a sorting electronic circuit that:
reads at least one of the plurality of LBAs from the LBA cache memory circuit to obtain a read LBA;
determines a group that the read LBA belongs to based at least in part on a predetermined grouping rule; and
determines (1) a quantity of groups in a plurality of groups, wherein the plurality of groups includes said group that the read LBA belongs to and (2) a quantity of data in each group in the plurality of groups after determining the group that the read LBA belongs to; and
writes LBAs belonging to a same group in the plurality of groups into a contiguous storage space of the LBA cache memory circuit.

2. The system recited in claim 1, wherein:
the predetermined grouping rule that is used to determine the group that the read LBA belongs to includes an identification field with a predetermined length at a predetermined location; and
a first read LBA and a second read LBA with a same value in the identification field are determined to belong to the same mapping table.

3. The system recited in claim 2, wherein the predetermined location and the predetermined length of the identification field are user-specified.

4. The system recited in claim 1, wherein determining the group that the read LBA belongs to includes:
assigning a counter with an initial count value of 0 to each group; and
controlling a counter value of the counter corresponding to a specific group to increase by 1 if the read LBA is determined to belong to the specific group.

5. The system recited in claim 4, wherein a preset group maximum value is determined based on a quantity of available counters.

6. The system recited in claim 1, wherein determining the group that the read LBA belongs to includes:
judging whether a quantity of read LBAs reaches a preset batch quantity;
stopping the read of the at least one of the plurality of LBAs if it is determined that the quantity of the read LBAs has reached the preset batch quantity; and
continuing the read of the at least one of the plurality of LBAs if it is determined that the quantity of the read LBAs has not reached the preset batch quantity.

7. The system recited in claim 1, wherein writing the LBAs includes:
assigning a writing pointer to each group; and
determining an initial value of the writing pointer for each group based on the quantity of the group and the quantity of the LBAs in each group in the plurality of groups.

8. The system recited in claim 7, wherein determining the initial value of the writing pointer comprises:
determining an initial value of a writing pointer of a first group in the plurality of groups based on a rule; and
for each subsequent group after the first group, determining an initial value of a writing pointer of a subsequent group based on an initial value of a writing pointer of a previous group and a quantity of LBAs in the previous group.

9. The system recited in claim 8, wherein writing the LBAs further includes:
determining a group to which a newly-read LBA that is newly read from the LBA cache memory circuit belongs based on the rule; and
writing the newly-read LBA into a writing location in the LBA cache memory circuit based on the group to which the newly-read LBA belongs to, wherein the writing location is indicated by the writing pointer of the group to which the newly-read LBA belongs to, causing the writing pointer to indicate a next writing location in the LBA cache memory circuit by updating the writing pointer.

10. The system recited in claim 1, wherein the mapping table cache memory circuit includes one or more of the following: a static random access memory or a dynamic random access memory or a flash memory.

11. A method, comprising:
storing a plurality of logical block addresses (LBAs) received from a host in a logical block address (LBA) cache memory circuit;
storing at least one of a plurality of mapping tables in a mapping table cache memory circuit, wherein:
the mapping table cache memory circuit has a size;
the plurality of mapping tables stores mapping information between the plurality of LBAs and a plurality of physical addresses on a solid state storage; and
the size of the mapping table cache memory circuit is strictly smaller than a sufficient size to simultaneously store all of the plurality of mapping tables;
using a sorting electronic circuit to read at least one of the plurality of LBAs from the LBA cache memory circuit to obtain a read LBA;
using the sorting electronic circuit to determine a group that the read LBA belongs to based at least in part on a predetermined grouping rule;
using the sorting electronic circuit to determine (1) a quantity of groups in a plurality of groups, wherein the plurality of groups includes said group that the read LBA belongs to and (2) a quantity of data in each group in the plurality of groups after determining the group that the read LBA belongs to; and
using the sorting electronic circuit to write LBAs belonging to a same group in the plurality of groups into a contiguous storage space of the LBA cache memory circuit.

12. The method recited in claim 11, wherein:
the predetermined grouping rule that is used to determine the group that the read LBA belongs to includes an identification field with a predetermined length at a predetermined location; and
a first read LBA and a second read LBA with a same value in the identification field are determined to belong to the same mapping table.

13. The method recited in claim 12, wherein the predetermined location and the predetermined length of the identification field are user-specified.

14. The method recited in claim 11, wherein determining the group that the read LBA belongs to includes:
assigning a counter with an initial count value of 0 to each group; and
controlling a counter value of the counter corresponding to a specific group to increase by 1 if the read LBA is determined to belong to the specific group.

15. The method recited in claim 14, wherein a preset group maximum value is determined based on a quantity of available counters.

16. The method recited in claim 11, wherein determining the group that the read LBA belongs to includes:
judging whether a quantity of read LBAs reaches a preset batch quantity;
stopping the read of the at least one of the plurality of LBAs if it is determined that the quantity of the read LBAs has reached the preset batch quantity; and
continuing the read of the at least one of the plurality of LBAs if it is determined that the quantity of the read LBAs has not reached the preset batch quantity.

17. The method recited in claim 11, wherein writing the LBAs includes:
assigning a writing pointer to each group; and
determining an initial value of the writing pointer for each group based on the quantity of the group and the quantity of the LBAs in each group in the plurality of groups.

18. The method recited in claim 17, wherein determining the initial value of the writing pointer comprises:
determining an initial value of a writing pointer of a first group in the plurality of groups based on a rule; and
for each subsequent group after the first group, determining an initial value of a writing pointer of a subsequent group based on an initial value of a writing pointer of a previous group and a quantity of LBAs in the previous group.

19. The method recited in claim 18, wherein writing the LBAs further includes:
determining a group to which a newly-read LBA that is newly read from the LBA cache memory circuit belongs based on the rule; and
writing the newly-read LBA into a writing location in the LBA cache memory circuit based on the group to which the newly-read LBA belongs to, wherein the writing location is indicated by the writing pointer of the group to which the newly-read LBA belongs to, causing the writing pointer to indicate a next writing location in the LBA cache memory circuit by updating the writing pointer.

* * * * *